United States Patent [19]

Oppliger

[11] Patent Number: 4,954,133
[45] Date of Patent: Sep. 4, 1990

[54] MIXTURES OF A 1:1 COPPER OR NICKEL COMPLEX OF A STILBENE-AZO OR STILBENE-AZOXY COMPOUND HAVING TWO 4,4'-(2,2'-DISULFOSTILBENYLENE) RADICALS AND A 1:1 COPPER OR NICKEL COMPLEX OF A STILBENE-AZO OR STILBENE-AZOXY COMPOUND HAVING ONE SUCH RADICAL

[75] Inventor: Max Oppliger, Allschwil, Switzerland

[73] Assignee: Sandoz Ltd., Basel, Switzerland

[21] Appl. No.: 828,934

[22] Filed: Feb. 12, 1986

Related U.S. Application Data

[63] Continuation of Ser. No. 705,744, Feb. 26, 1985, abandoned, which is a continuation of Ser. No. 455,140, Jan. 3, 1983, abandoned.

[30] Foreign Application Priority Data

Dec. 31, 1981 [DE] Fed. Rep. of Germany ....... 3151978

[51] Int. Cl.$^5$ ..................... C09B 67/22; C09B 67/24; C09B 45/28; C07C 238/08
[52] U.S. Cl. ............................................ 8/681; 8/638; 8/639; 8/641; 8/662; 8/682; 8/683; 8/685; 534/566; 534/569; 534/573; 534/689; 534/690; 534/691; 534/728
[58] Field of Search ............... 534/566, 569, 689, 690, 534/573; 8/681, 639, 641, 662, 682, 683, 685

[56] References Cited

U.S. PATENT DOCUMENTS

| | | | |
|---|---|---|---|
| 1,708,897 | 4/1929 | Rheiner | 260/143 |
| 2,314,023 | 3/1943 | Straub et al. | 260/143 |
| 3,905,949 | 9/1975 | Perkins et al. | 260/143 |
| 3,953,419 | 4/1976 | Pedrazzi | 260/143 |
| 4,006,130 | 2/1977 | Ditzer | 260/173 |
| 4,141,889 | 2/1979 | Allan | 260/144 |
| 4,169,832 | 10/1979 | Wicki et al. | 260/169 |
| 4,297,278 | 10/1981 | Nickel | 260/143 |
| 4,390,470 | 6/1983 | Wicki et al. | 260/166 |

FOREIGN PATENT DOCUMENTS

| | | | |
|---|---|---|---|
| 16975 | 10/1980 | European Pat. Off. | 260/143 |
| 746455 | 6/1944 | Fed. Rep. of Germany | 260/143 |
| 848678 | 9/1952 | Fed. Rep. of Germany | 260/143 |
| 751512 | 10/1952 | Fed. Rep. of Germany | 260/143 |
| 866704 | 2/1953 | Fed. Rep. of Germany | 260/143 |
| 340002 | 9/1959 | Switzerland | 260/143 |
| 503609 | 4/1939 | United Kingdom | 260/153 |
| 736619 | 9/1955 | United Kingdom | 260/143 |

OTHER PUBLICATIONS

Colour Index, Third Edition, pp. 4368–4370 (1971). C.I. 40210, 40230, 40235, 40265, 40275 and 40290.

*Primary Examiner*—Floyd D. Higel
*Attorney, Agent, or Firm*—Gerald D. Sharkin; Richard E. Vila; Melvyn M. Kassenoff

[57] ABSTRACT

Compounds of the formula

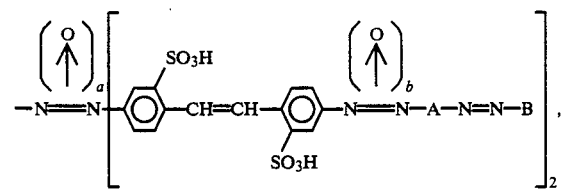

wherein
each A, independently, is a

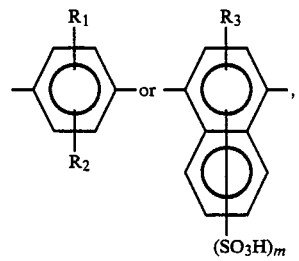

wherein
$R_1$ is hydrogen, halo, $C_{1-4}$alkyl or $C_{1-4}$alkoxy,
$R_2$ is hydrogen, halo, $C_{1-4}$alkyl, $C_{1-4}$alkoxy, —NHCONH$_2$ or —NHCOC$_{1-4}$alkyl,
$R_3$ is hydrogen or methoxy, and
m is 0, 1 or 2,
each B, independently, is a radical of a diazo or coupling component, and a and each b, independently, are 0 or 1,
and metal complexes thereof, which compounds or complexes are in free acid or salt form, and mixtures thereof with a compound of the formula

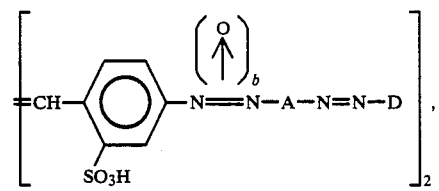

or a metal complex thereof, wherein A and b are as defined above and D is a radical of a diazo or coupling component of the benzene or 1-naphthalene series are useful for dyeing and printing hydroxy group- or nitrogen-containing organic substrates, especially cellulose fibre-containing textiles (e.g., cotton), paper and leather. The fastness properties of the obtained dyeings and prints may be further improved by after-treating the dyed or printed substrate with a special fixing agent.

10 Claims, No Drawings

MIXTURES OF A 1:1 COPPER OR NICKEL COMPLEX OF A STILBENE-AZO OR STILBENE-AZOXY COMPOUND HAVING TWO 4,4'-(2,2'-DISULFOSTILBENYLENE) RADICALS AND A 1:1 COPPER OR NICKEL COMPLEX OF A STILBENE-AZO OR STILBENE-AZOXY COMPOUND HAVING ONE SUCH RADICAL

This application is a continuation of application Ser. No. 06/705,744, filed Feb. 26, 1985 and now abandoned, which is a continuation of application Ser. No. 06/455,140, filed Jan. 3, 1983 and now abandoned.

This invention relates to stilbene-azo- or stilbene-azoxy-compounds, processes for their preparation and their use for dyeing and printing hydroxy-group- or nitrogen-containing organic substrates employing conventional dyeing methods and optionally after-treating the dyed or printed substrate with a cationic fixing agent.

The invention provides compounds which, in the free acid form, correspond to formula I,

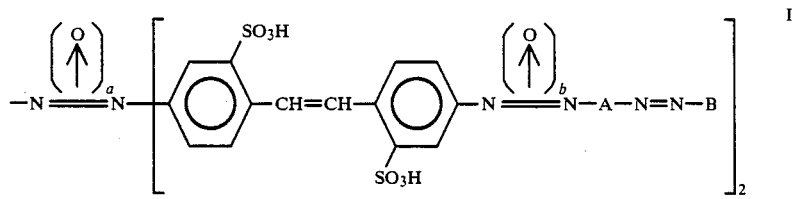

in which
each A, independently, is a radical of formula (a) or (b),

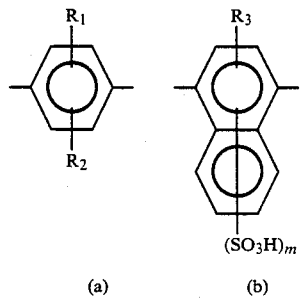

$R_1$ is hydrogen, halogen, $C_{1-4}$alkyl or $C_{1-4}$alkoxy,
$R_2$ is hydrogen, halogen, $C_{1-4}$alkyl, $C_{1-4}$alkoxy, —NHCONH$_2$ or —NHCO($C_{1-4}$alkyl),
$R_3$ is hydrogen or methoxy,
m is 0, 1 or 2,
each B, independently, is a radical of a diazo or coupling component, and
a and each b, independently, are 0 or 1,
mixtures of such compounds and metal complexes thereof, with the provisos that (i) when the compound of formula I is not metallized and both A's are of formula (a), in at least one A, when one of $R_1$ and $R_2$ is $C_{1-4}$alkyl in a position ortho to the azo radical attached to B and the other of $R_1$ and $R_2$ is $C_{1-4}$alkoxy, then said $C_{1-4}$alkoxy group is not in a position meta to the azo radical attached to B, and (ii) when the compound of formula I is not metallized and both A's are of formula (b), at least one A is substituted by at least one group selected from methoxy and sulpho, which compounds are in free acid or salt form.

Preferably, the compounds of formula I are metallized.

Preferably, when the compounds of formula I are metallized the following provisos apply:

(i) When both A's are of formula (a), in at least one A when one of $R_1$ and $R_2$ is $C_{1-4}$alkyl in a position ortho to the azo radical attached to B and the other of $R_1$ and $R_2$ is $C_{1-4}$alkoxy, said $C_{1-4}$alkoxy group is not in a position meta to the azo B when the alkyl group is in an ortho position to radical attached to B; and (ii) When both A's are of formula (b), at least one A is substituted by at least group selected from methoxy and sulpho.

The compounds of formula I when in metal complex form are preferably 1:1 complexes by which complexes are meant metal complexes wherein each metal-free azo compound unit is complexed with one metal ion i.e., each metal-free azo compound is complexed with two metal ions, each metal ion being complexed with one metal-free azo compound. Preferred complexes are the 1:1 nickel- or 1:1 copper-complexes including the components A and B, particularly the 1:1 copper complexes.

The substituents $R_1$ and $R_2$ of the radical of formula (a) are preferably para to each other.

B is preferably the radical of a diazo or coupling component selected from the aromatic-carbocyclic series, the aromatic-heterocyclic series and the aliphatic series containing an active methylene group.

More preferably, each B, independently, is a radical of formula (c), (d), (e), (f) or (g),

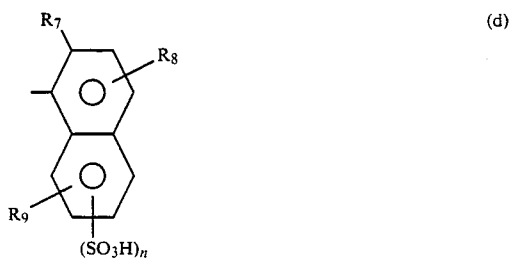

-continued

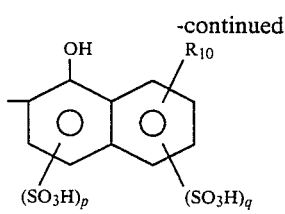

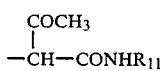

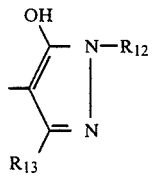

wherein
$R_4$ is hydrogen, hydroxy or methoxy,
$R_5$ is hydrogen, hydroxy, $C_{1-4}$alkyl, $C_{2-4}$hydroxyalkyl, $C_{1-4}$alkoxy, $C_{2-4}$hydroxyalkoxy or —$N(R_{14})_2$,
each $R_{14}$, independently, is hydrogen, $C_{1-4}$alkyl or $C_{2-4}$alkyl substituted by 1 or 2 substituents independently selected from hydroxy, cyano, halogen and $C_{1-4}$alkoxy,
$R_6$ is hydrogen, $C_{1-4}$alkyl, $C_{2-4}$hydroxyalkyl, $C_{1-4}$alkoxy, —NHCO($C_{1-4}$alkyl), carboxy or sulpho,
$R_7$ is hydrogen, hydroxy or methoxy,
$R_8$ is hydrogen, carboxy or sulpho,
$R_9$ is hydrogen or hydroxy,
n is 0, 1 or 2,
$R_{10}$ is hydrogen, hydroxy, amino, —NHCO($C_{1-4}$alkyl) or benzoylamino or phenylamino in which the phenyl rings may be substituted by 1 or 2 substituents independently selected from halogen, nitro, amino, $C_{1-4}$alkyl and $C_{1-4}$alkoxy,
p is 0 or 1, q is 0, 1 or 2,
$R_{11}$ is $C_{1-4}$alkyl; phenyl, phenyl substituted by 1 to 3 substituents independently selected from halogen, $C_{1-4}$alkyl, $C_{1-4}$-alkoxy, —NHCOCH$_3$, benzoylamino, carboxy and sulpho; or 1- or 2-naphthyl which may be mono- or di-substituted by sulpho,
$R_{12}$ is $C_{1-4}$alkyl, $C_{2-4}$alkyl substituted by 1 or 2 substituents independently selected from halogen, hydroxy, cyano and $C_{1-4}$alkoxy; phenyl, phenyl substituted by 1 to 3 substituents independently selected from halogen, $C_{1-4}$alkyl, $C_{1-4}$alkoxy, —NHCOCH$_3$, benzoylamino, carboxy and sulpho; or 1- or 2-naphthyl which may be substituted by 1 or 2 sulpho groups, and
$R_{13}$ is $C_{1-4}$alkyl or carboxy.

The sum of sulpho and carboxy groups present in a compound of formula I is preferably 4 to 10; more preferably, it is 6 to 10 and especially 6 to 8.

Any halogen is generally fluorine, chlorine, bromine or iodine; any halogen as a phenyl substituent is preferably chlorine or bromine, especially chlorine; any halogen as an alkyl substituent is preferably fluorine, chlorine or bromine, especially chlorine.

Any alkyl as $R_1$ and $R_2$, independently, is preferably methyl or ethyl, more preferably methyl; any alkoxy, independently is preferably methoxy or ethoxy, more preferably methoxy.

Where $R_2$ is an alkylcarbonylamino group, this group preferably contains a $C_{1-2}$alkyl group, more preferably a methyl group.

$R_1$ is preferably $R_{1a}$, where $R_{1a}$ is hydrogen, $C_{1-2}$alkyl or $C_{1-2}$alkoxy; more preferably, $R_1$ is $R_{1b}$, where $R_{1b}$ is hydrogen, methyl or methoxy. Even more preferably, $R_1$ is $R_{1c}$, where $R_{1c}$ is hydrogen or methoxy; most preferably, $R_1$ is methoxy.

$R_2$ is preferably $R_{2a}$, where $R_{2a}$ is hydrogen, chlorine, $C_{1-2}$alkyl, $C_{1-2}$alkoxy or —NHCOC$_{1-2}$alkyl. More preferably, $R_2$ is $R_{2b}$, where $R_{2b}$ is hydrogen, chlorine, methyl, methoxy or —NHCOCH$_3$. Even more preferably, $R_2$ is $R_{2c}$, where $R_{2c}$ is hydrogen methyl or methoxy; most preferably, $R_2$ is hydrogen.

The radical (a) is preferably ($a_1$) of the formula

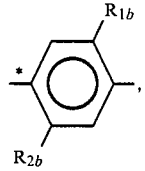

wherein the asterisk denotes the carbon atom linked to the azo group attached to stilbene radical; more preferably, it is ($a_2$), where ($a_2$) is a radical ($a_1$), in which $R_{1b}$ is $R_{1c}$ and $R_{2b}$ is $R_{2c}$. Most preferably, it is a radical ($a_3$) of the formula

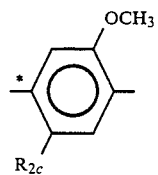

especially with $R_{2c}$ being hydrogen.

The radical (b) is preferably ($b_1$) of the formula

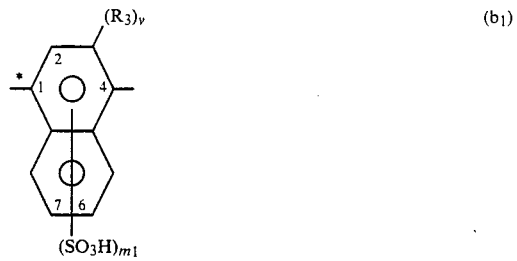

wherein v is 0 or 1 and $m_1$ is 1 or 2; and the asterisk denotes the carbon atom bound to the azo group attached to the stilbene radical.

When $m_1$ is 1, the sulpho group is preferably in the 6- or 7- position. When $m_1$ is 2, the two sulpho groups are preferably in the 3,6-positions and v is 0. More preferably, (b) is ($b_2$), where ($b_2$) is a radical ($b_1$) wherein $m_1$ is 1 and the sulpho group is in the 6- or 7-position.

Each A, independently, is preferably $A_1$, where $A_1$ is a radical ($a_1$) or ($b_1$). More preferably, it is $A_2$, where $A_2$ is a radical ($a_2$) or ($b_2$). Most preferably, A is $A_3$, where $A_3$ is a radical ($a_3$).

Any alkyl or alkoxy as $R_5$ contains preferably 1 or 2 carbon atoms. Any hydroxyalkyl- or hydroxyalkoxy-group contains preferably 2 or 3 carbon atoms (with the hydroxy group in other than the 1-position); especially, it is 2-hydroxyethyl, 2-hydroxyethoxy or 2- or 3-hydroxypropoxy.

Any alkyl as $R_{14}$ is preferably methyl or ethyl. Any substituted alkyl is preferably substituted by 1 or 2 substituents independently selected from hydroxy, cyano, chloro and methoxy in other than the 1-position; when the alkyl group contains two substituents, they are on different carbon atoms with the alkyl moiety containing 3 or 4 carbon atoms. More preferably, the alkyl group contains only one substituent thereof; most preferably, it is 2-hydroxyethyl or 2- or 3-hydroxypropyl.

Any alkyl as $R_6$ is preferably methyl or ethyl, especially methyl; any alkoxy is preferably methoxy or ethoxy, especially methoxy. Any hydroxyalkyl contains preferably 2 or 3 carbon atoms with the hydroxy group in other than the 1-position; most preferably, it is 2-hydroxyethyl.

Any alkylcarbonylamino as $R_6$ contains preferably a $C_{1-2}$-alkyl group; most preferably, it is acetamido.

When $R_6$ is carboxy, it is preferably in other than the 6-position.

$R_4$ is preferably $R_{4a}$, where $R_{4a}$ is hydrogen or hydroxy.

Each $R_{14}$, independently, is preferably $R_{14a}$, where $R_{14a}$ is hydrogen, $C_{1-2}$alkyl or $C_{2-3}$alkyl monosubstituted in the 2- or 3-position by hydroxy, cyano or chloro. More preferably, it is independently, $R_{14b}$, where $R_{14b}$ is $C_{1-2}$alkyl or $C_{2-3}$alkyl monosubstituted by hydroxy, with the hydroxy group in the 2- or 3-position.

$R_5$ is preferably $R_{5a}$, where $R_{5a}$ is hydrogen, $C_{1-2}$alkyl, $C_{1-2}$alkoxy, 2-hydroxyethyl, 2-hydroxyethoxy, 2- or 3-hydroxypropoxy or $-N(R_{14a})_2$. More preferably, it is $R_{5b}$, where $R_{5b}$ is hydrogen, methyl, ethyl, methoxy, ethoxy, 2-hydroxyethoxy, 2- or 3-hydroxypropoxy or $-N(R_{14b})_2$. Most preferably, it is $R_{5c}$, where $R_{5c}$ is hydrogen, methoxy, ethoxy or $-N(R_{14b})_2$.

$R_6$ is preferably $R_{6a}$, where $R_{6a}$ is hydrogen, methyl, ethyl, methoxy, ethoxy, acetamido, carboxy (in other than the 6-position) or sulpho. More preferably, it is $R_{6b}$, where $R_{6b}$ is hydrogen, methyl, methoxy, acetamido or sulpho. Most preferably, it is $R_{6c}$, where $R_{6c}$ is hydrogen or sulpho.

The radical (c) is preferably (c$_1$), where (c$_1$) is the radical (c), wherein $R_4$ is $R_{4a}$, $R_5$ is $R_{5a}$ and $R_6$ is $R_{6a}$. More preferably, it is (c$_2$), where (c$_2$) is a radical (c), wherein $R_4$ is $R_{4a}$, $R_5$ is $R_{5b}$ and $R_6$ is $R_{6b}$. More preferably, it is (c$_3$), where (c$_3$) is a radical (c), wherein $R_4$ is $R_{4a}$, $R_5$ is $R_{5c}$ (with $R_{5c}$ preferably being hydrogen when $R_{4a}$ is hydroxy), and $R_6$ is $R_{6c}$. Most preferably, it is (c$_4$) of the formula

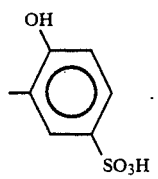

Preferably, in the radical (d) $R_7$ is hydroxy, $R_9$ is hydrogen and n is n', where n' is 0 or 1 with the sulpho group in the 5-, 6- or 7-position. The radical (d) is preferably (d$_1$) of the formula

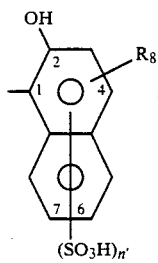

more preferably, it is (d$_2$), where (d$_2$) is a radical (d$_1$), wherein the positions of the substituents are as follows:
(i) $R_8$ is hydrogen and n' is 1: the sulpho group is in the 5-, 6- or 7-position;
(ii) $R_8$ is carboxy in the 3-position, n' is 0;
(iii) $R_8$ is sulpho in the 4-position, n' is 0;
(iv) $R_8$ is sulpho in the 3-position, n' is 1 with the sulpho group in the 6-position.

In the radical (e) the sum of p+q is preferably 1 or 2; when the sum of p+q is 1, q is preferably 0.

Any alkylcarbonylamino as $R_{10}$ contains preferably a $C_{1-2}$-alkyl moiety, especially a methyl group.

Where $R_{10}$ is benzoylamino or phenylamino and the phenyl rings are substituted by any alkyl or alkxoy, these groups contain preferably 1 or 2 carbon atoms; particularly, they are methyl or methoxy.

In any substituted benzoylamino- or phenylamino-group the phenyl rings bear preferably 1 or 2 substituents selected from chlorine, nitro, amino, methyl and methoxy. More preferably, they bear only one substituent selected from chlorine, methyl and methoxy. Most preferably, the phenyl rings are unsubstituted.

$R_{10}$ is preferably $R_{10a}$, where $R_{10a}$ is hydrogen, amino, acetamido, benzoylamino or phenylamino, where the phenyl rings are optionally substituted by one substituent selected from chlorine, methyl and methoxy. More preferably, it is $R_{10b}$, where $R_{10b}$ is hydrogen, amino, acetamido, benzoylamino or phenylamino, where the phenyl rings are unsubstituted. Most preferably, it is $R_{10c}$, where $R_{10c}$ is hydrogen, acetamido or benzoylamino.

The radical (e) is preferably (e$_1$) of the formula

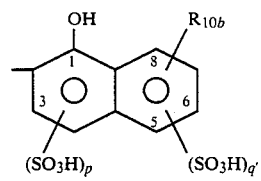

where q' is 0 or 1. More preferably, it is (e$_2$), where (e$_2$) is a radical (e$_1$) in which the positions of the substituents are as follows:
(i) p is 1, q' is 1 and $R_{10b}$ is other than hydrogen: the two sulpho groups are in the 3,6-positions and $R_{10b}$ is in the 8-position;
(ii) p is 1, q' is 1 and $R_{10b}$ is hydrogen: the sulpho group $(SO_3H)_p$ is in the 3-position; the sulpho group $(SO_3H)_q$ is in the 5-, 6- or 7-position;
(iii) p is 1, q' is 0 and $R_{10b}$ is other than hydrogen: the sulpho group is in the 3-position; $R_{10b}$ is in the 6- or 7-position. In a radical (e$_2$) $R_{10b}$ is most preferably $R_{10c}$.

Any alkyl as $R_{11}$ is preferably methyl or ethyl. When $R_{11}$ is substituted phenyl, any alkyl or alkoxy group as a phenyl substituent is preferably methyl or methoxy. The phenyl radical is preferably substituted by 1 or 2 substituents independently selected from chlorine, methyl, methoxy, acetamido, benzoylamino, carboxy and sulpho; more preferably, it is substituted by 1 or 2 substituents independently selected from chlorine, methyl, methoxy, carboxy and sulpho.

Any 1- or 2-naphthyl as $R_{11}$ contains preferably a sulpho group which, for the 1-naphthyl radical, is preferably in the 4,-, 5-, 6- or 7-position.

$R_{11}$ is preferably $R_{11a}$, where $R_{11a}$ is methyl, ethyl, phenyl, phenyl substituted by 1 or 2 substituents independently selected from chlorine, methyl, methoxy, acetamido, benzoylamino, carboxy and sulpho; or is sulphonaphthyl-1 or -2; more preferably, it is $R_{11b}$, where $R_{11b}$ is phenyl, phenyl substituted by 1 or 2 substituents independently selected from chlorine, methyl, methoxy, carboxy and sulpho, or sulphonaphthyl-1 or -2.

The radical (f) is preferably ($f_1$), where ($f_1$) is a radical (f) in which $R_{11}$ is $R_{11a}$; more preferably, it is ($f_2$), where ($f_2$) is a radical (f) in which $R_{11}$ is $R_{11b}$.

Any alkyl as $R_{12}$ is preferably methyl or ethyl; any substituted alkyl is preferably $C_{2-3}$alkyl monosubstituted in the 2- or 3-position by chlorine, hydroxy or methoxy.

Any substituted phenyl as $R_{12}$ bears preferably 1 or 2 substituents independently selected form chlorine, methyl, methoxy, acetamido, benzoylamino, carboxy and sulpho. Any naphthyl as $R_{12}$ contains preferably one sulpho group.

$R_{12}$ is preferably $R_{12a}$, where $R_{12a}$ is methyl, ethyl, phenyl, phenyl substituted by 1 or 2 substituents independently selected from chlorine, methyl, methoxy, acetamido, benzoylamino, carboxy and sulpho; or sulphonaphthyl-1 or -2; more preferably, it is $R_{12b}$, where $R_{12b}$ is methyl, ethyl, phenyl, phenyl substituted by 1 or 2 substituents independently selected from chlorine, methyl, methoxy, carboxy and sulpho; or sulphonaphthyl-1 or -2. Most preferably, it is $R_{12c}$, where $R_{12c}$ is phenyl or phenyl monosubstituted by chlorine, methyl, methoxy, carboxy or sulpho.

In a sulphonaphthyl-1 radical as $R_{12a}$ or $R_{12b}$ the sulpho group is preferably in the 4-, 5-, 6- or 7-position.

Any alkyl as $R_{13}$ is preferably methyl.

$R_{13}$ is preferably $R_{13a}$, where $R_{13a}$ is methyl or carboxy, especially methyl.

The radical (g) is preferably ($g_1$), where ($g_1$) is a radical (g), wherein $R_{12}$ is $R_{12a}$ and $R_{13}$ is $R_{13a}$. More preferably, it is ($g_2$), where ($g_2$) is a radical (g), wherein $R_{12}$ is $R_{12b}$ and $R_{13}$ is $R_{13a}$. Most preferably, it is ($g_3$), where ($g_3$) is a radical (g), wherein $R_{12}$ is $R_{12c}$ and $R_{13}$ is methyl.

Each B, independently, is preferably $B_1$, where $B_1$ is a radial of formula ($c_1$), ($d_1$), ($e_1$), ($f_1$) or ($g_1$); more preferably, it is $B_2$, where $B_2$ is a radical of formula ($c_2$), ($d_2$), ($e_2$), ($f_2$) or ($g_2$); more preferably, it is $B_3$, where $B_3$ is a radical of formula ($c_3$), ($d_2$), ($e_2$) or ($g_3$); more preferably, it is $B_4$, where $B_4$ is a radical of formula ($c_3$), ($d_2$) or ($e_2$); most preferably, it is $B_5$, where $B_5$ is a radical of formula ($c_4$) or ($d_2$).

Preferred are compounds of formula I wherein, for both parts of the molecule, the b's are identical to each other and are preferably O, and wherein the A's are identical to each other and likewise the B's are identical to each other, and wherein furthermore:

(1) A is $A_1$ and B is $B_1$;
(2) A is $A_2$ and B is $B_2$;
(3) A is $A_2$ and B is $B_3$;
(4) A is $A_2$ and B is $B_4$;
(5) A is $A_3$ and B is $B_3$;
(6) A is $A_3$ and B is $B_4$; and
(7) A is $A_3$ and B is $B_5$.

The present invention further provides mixtures consisting of a compound of formula I, wherein B is D, where D is a radical of formula (c) or (d), or a metal complex thereof, together with a compound which, in the free acid form, corresponds to formula II,

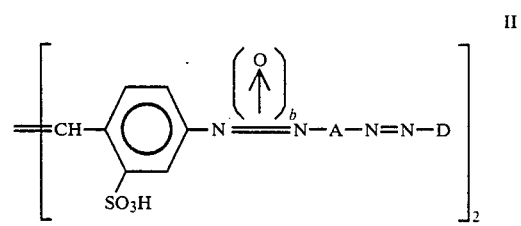

wherein A and D are as defined above and b is 0 or 1, or a metal complex thereof, which mixtures are in free acid or salt form.

Preferably, the mixture contains 70 to 20% (by weight) of a compound of formula I or a metal complex thereof and 30 to 80% (by weight) of a compound of formula II or a metal complex thereof; more preferably, it contains 60 to 40% (by weight) of a component (I) and 40 to 60% (by weight) of a component (II); most preferably, the ratio of the components (I) and (II) by weight is about 1:1.

Preferred compounds in these mixtures are those containing the preferred components as defined above. When the compounds of these mixtures are in metal complex form, they are preferably 1:1 copper complexes.

When the compounds of formula I or the mixtures of compounds of formulae I and II are in the salt form, the cations of the sulpho and carboxy groups are not critical and may be any of those non-chromophoric cations conventional in the field of anionic direct dyes. Examples of such cations are alkali metal cations and unsubstituted or substituted ammonium cations e.g., lithium, sodium, potassium, ammonium, mono-, di-, tri- and tetra-methylammonium, triethylammonium and mono-, di- and tri-ethanolammonium.

The preferred cations are the alkali metal cations and ammonium, with sodium being the most preferred.

In a compound of formula I or in a mixture of a compound of formula I with a compound of formula II when in salt form, the cations of the sulpho- and carboxy-groups present may be the same or different and are preferably the same.

The present invention further provides a process for the preparation of compounds of formula I or of mixtures of these compounds with compounds of formula II comprising connecting two compounds of formula III,

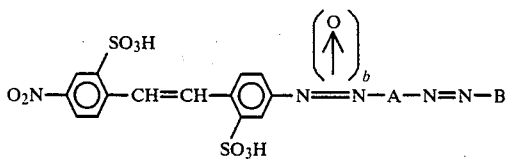
III which may be the same or different, by reducing the nitro groups optionally in the presence of a compound of formula II, and optionally metallizing before this reduction or afterwards by reacting with a metal-donating compound.

The compounds of formula III wherein B is $B_x$, where $B_x$ is a radical of a coupling component, and b is 0 may be obtained by diazotizing a compound of formula IV

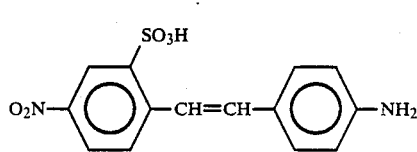
IV and coupling with a compound of formula V,

A—NH$_2$   V diazotizing the thus obtained amino-stilbene-azo compound and coupling with a compound of formula VI, H—B$_x$   VI wherein $B_x$ is as defined above.

Those compounds of formula III wherein B is D, where D is a radical of formula (c) or (d), and b is 0 or 1 may be prepared by condensing a compound of formula VII

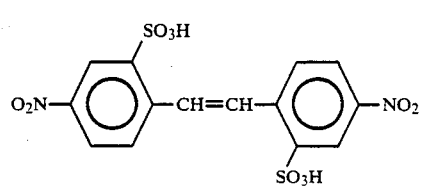
VII and a compound of formula VIII,

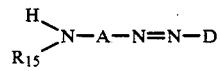
VIII wherein $R_{15}$ is H, CH$_3$ or —CH$_2$SO$_3$H and A and D are as defined above. By this condensation it is possible that not only one, but both nitro groups present in the same molecule of a compound of formula VII will be reacted with a compound of formula VIII resulting in a compound of formula II. In the case where the compound of formula II is not separated from the reaction mixture before the subsequent reducing reaction, a mixture of a compound of formula I and a compound of formula II according to the invention will be obtained.

Diazotization and coupling reactions may be effected in conventional manner. Likewise, metallization is carried out in accordance with known methods. For example, coppering to obtain a 1:1 copper complex is effected by conventional oxidative coppering or more preferably by demethylation coppering.

Reductive connecting of two nitro compounds may be effected in accordance with known methods, suitably, in a strongly alkaline reaction medium at temperatures of 40° to 90° C. using a mild reducing agent such as glucose, glycerol, etc.

Depending on the starting materials and on the reaction conditions used for the condensation reaction of a nitro compound with an amino compound or of two nitro compounds, the end products which are obtained contain either azo- or azoxy-groups or azo- and azoxy-groups both together in varying portions.

Particularly, when condensing a nitro compound with an N-alkylamino compound an azo bridge is obtained. When condensing two nitro compounds it depends on the reducing agent employed whether an azo- or an azoxy-bridge or both together are obtained. For example, reductive connection of two nitro groups with glycerol mainly results in an azoxy compound, whereas employing glucose mainly results in an azo compound.

The compounds of formula I or mixtures of a compound of formula I and a compound of formula II may be isolated in accordance with known methods, for example by conventional salting out with a small amount of an alkali metal salt, filtering and drying in vacuo.

The starting materials of formulae III to VIII are either known or may be prepared i accordance with known methods from available starting materials.

The compounds of formula I and mixtures thereof and mixtures of a compound of formula I with a compound of formula II which are preferably in salt form are useful for dyeing or printing hydroxy group- or nitrogen-containing organic substrates. Preferred substrates are paper, leather and textiles comprising or consisting of cellulose fibres, such as cotton.

The compounds and mixtures according to the invention show high affinity for the substrate and therefore are good direct dyes. Dyeing and printing with the dyes and mixtures according to the invention may be carried out in accordance with known methods. Dyeing of natural or regenerated cellulose such as cotton is preferably carried out according to the conventional exhaust dyeing method using temperatures from 50° to 100° C. Further suitable is the continuous dyeing method and thus processes such as cold pad-batch, pad-steam, pad-roll or pad-dry may be applied.

The dyestuffs and mixtures of the invention give deep dyeings and show high exhaustion yields. Furthermore, they are not adversely affected by electrolytes. The dyestuffs are also suitable for dyeing in combination with analogous dyes showing similar dyeing properties.

Dyeing and prints on the above mentioned substrates exhibit good wet fastnesses (such as fastness to water, washing or sweat) and good light fastness. Furthermore, they show good fastness to peroxide, perborate and chlorinated water. The fastness to dry cleaning is also good.

The wet-fastness properties of the direct dyestuffs on cellulose fibre containing textile material may be notably improved by a special resin after-treatment with cationic auxiliaries. Particularly, this treatment gives improved wash-fastness properties, allowing repeated washing at high temperatures.

Suitable for applying to the dyed or printed substrate is a fixing agent comprising a precondensate or mixture of either (A) the product of reacting a mono- or poly-

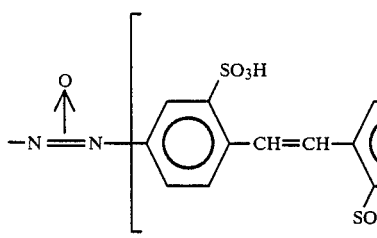

functional primary or secondary amine with cyanamide, dicyandiamide, guanidine or biguanide; or ammonia with cyanamide or dicyandiamide, said product (A) containing reactive hydrogen atoms bound to nitrogen, or (B) a quaternary polyalkylene polyamine, with (C) an N-methylol derivative of a urea, melamine, guanidine, triazinone, urone, carbamate or acid amide, optionally together with (D) a catalyst for the crosslinking of N-methylol compounds of the type (C) above.

Details concerning the fixing agent as a combination of (A), (C) and (D) and its use are described in British Published Patent Application No. 2 070 006, of which the whole subject matter disclosed on pages 1 to 6 is hereby incorporated by reference. Details concerning the combination (B), (C) and (D) are described in British Published Patent Application No. 2 084 597, of which the entire subject matter disclosed on pages 1 to 5 and 7 is hereby incorporated by reference.

The following examples further serve to illustrate the subjects of the invention. In the examples all parts and percentages are by weight or volume and all temperatures are in degrees Centigrade.

PREPARATION EXAMPLES

EXAMPLE 1

57 Parts 4,4'-dinitrostilbene-2,2'-disulphonic acid are dissolved in 250 parts water and 13 parts 30% sodium hydroxide solution and are reacted at 85° with 34 parts 2-hydroxy-2'-methoxy-4'-methylamino-1,1'-azobenzene-5-sulphonic acid dissolved in 900 parts water and 66 parts 30% sodium hydroxide solution. Portions of a compound of formula IIA

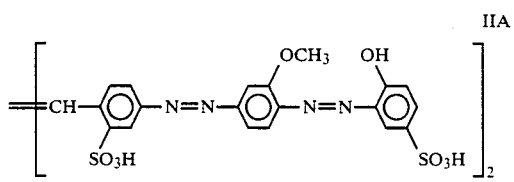

which is obtained as a side product during condensation, are precipitated by the addition of ethanol and filtered off. The filtrate is evaporated to dryness, and the residue thus obtained is dissolved in 700 parts water and 65 parts 30% sodium hydroxide solution. After the addition of 65 parts glycerol, the mixture is refluxed for one hour whilst stirring. The pH of the mixture is then adjusted to 9 by adding hydrochloride acid. Subsequently, demethylation coppering is effected under conventional reaction conditions. The resulting compound is salted out using sodium chloride, filtered and dried. The dyestuff thus obtained which, in the free acid form, corresponds to the formula is a dark powder; it gives dyeings on cotton of a dark-brown shade. The dyeings and especially those after-treated according to the method of Application Example C or D show remarkable wet fastness properties.

EXAMPLE 2

In analogy to the procedure described in Example 1 (with the 34 parts of 2-hydroxy-2'-methoxy-4'-methylamino-1,1'-azobenzene-5-sulphonic acid being added dropwise to the dinitrostilbene compound during 4 hours) but without separating the obtained portions of the compound of formula IIA, the mixture of dyestuffs consisting of the compound of formula IA with the 1:1 copper complex of a compound of formula IIA (in a by-weight-ratio of about 1:1) is obtained. This mixture gives dyeings on cotton of a dark-brown shade. These dyeings, especially when after-treated according to the method of Application Example C or D show excellent wet fastness properties.

EXAMPLE 3

20 Parts 4-amino-4'-nitrostilbene-2,2'-disulphonic acid in 300 parts water are diazotized in conventional indirect manner at 5° to 7°. After diazotization is completed, the excess of nitrous acid is decomposed by adding a small quantity of amidosulphonic acid.

6.8 Parts 2-methoxyphenylamine are dissolved in 200 parts water and 8.6 parts 30% hydrochloric acid and are added to the diazo mixture described above. The pH is adjusted to 4 by the addition of 14 parts sodium acetate. Stirring is effected overnight at 0° to 5°. The pH of the reaction mixture is then adjusted to 7 by adding 10 parts sodium bicarbonate, while coupling is completed at room temperature. By heating the mixture to 70° the reaction product is dissolved and is then precipitated at pH 1.5 by adding 30% hydrochloric acid. A dyestuff which, in the free acid form, corresponds to the formula

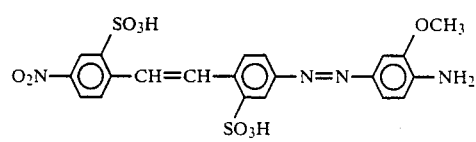

is obtained as a violet powder by isolating and drying.

26.7 Parts of this dye powder are diazotized in conventional indirect manner with sodium nitrite and are coupled with 12.3 parts 2-hydroxynaphthalene-4-sulphonic acid under soda-alkaline conditions. Subsequently, the thus prepared dyestuff is salted out, isolated and dried. A dyestuff which, in the free acid form, corresponds to the formula

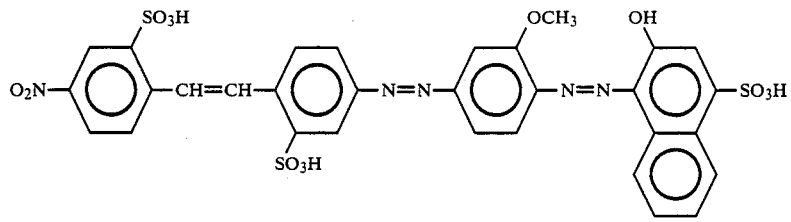

is obtained as a dark powder. To this powder the corresponding amount of diethanolamine and copper tetramine sulphate is added to form the 1:1 copper complex. The demethylation coppering is effected while refluxing for several hours. The thus obtained blue dyestuff is salted out and filtered off; it corresponds, in the free acid form, to the formula

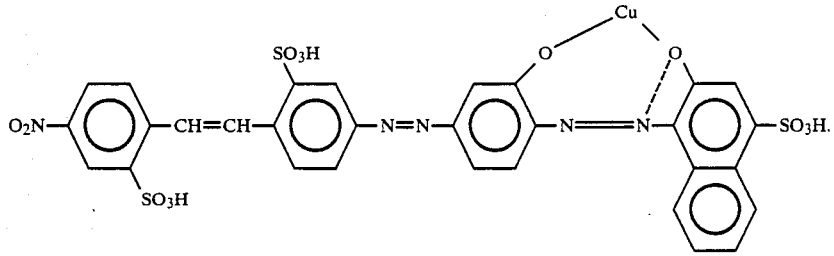

To the wet past of this dyestuff which is dissolved in 200 parts water, 18 parts 30% sodium hydroxide solution are added. At 45°–50° a solution of 1.3 parts glucose in 12 parts water is added dropwise thereto. Shortly afterwards, the dyestuff which, in the free acid form, corresponds to the formula is salted out and is isolated by filtering off and drying. The dyestuff is obtained as a dark powder and gives dyeings on cotton of a grey shade.

The dyestuffs and mixtures prepared according to Examples 1 to 3 are obtained in the sodium salt form.

EXAMPLES 4 to 59

In analogy with the procedure given in the preceding Preparation Examples further dyestuffs may be prepared which, in the free acid form, correspond to the formula

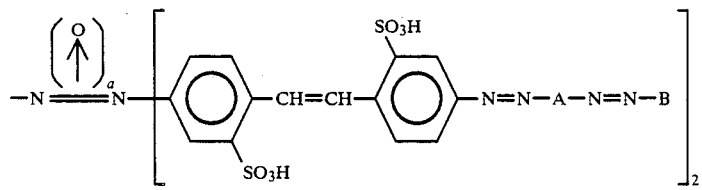

wherein, depending on the method used for the connection of two (same) nitro compounds of formula III, a is 0 or 1 or a mixture of a compound, wherein a is 0, with a compound, wherein a is 1, may be obtained. Depending on the reaction- and isolation-conditions, these dyestuffs are obtained in the sodium salt form.

In the following Table the dyestuffs are listed by defining the components A and B which, in the case where a metal complex is formed, represent the corresponding metallizable starting material. In the compo-

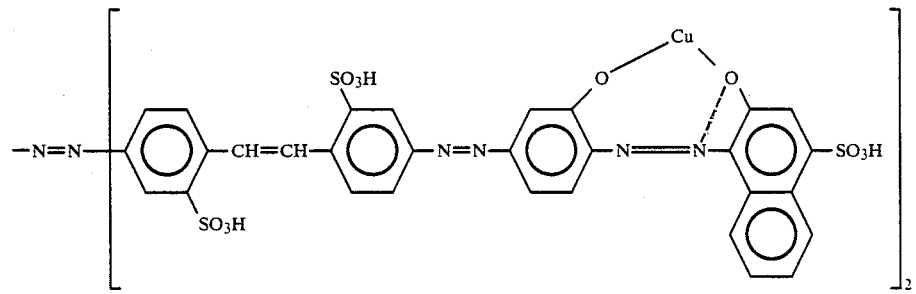

nent A, the asterisk denotes the carbon atom which is bound to the azo group connected with the stilbene radical.

The dyestuffs of Examples 4–10, 17–25, 35–38, 40, 41, 44–46, 50, 51, 54–57 and 59 may be prepared in analogy with the method described in Example 1 or 3. The dyestuffs of Examples 11–16, 26–34, 39, 42, 43, 47–49, 52, 53 and 58 are prepared in analogy with the method described in Example 3. In case where the end product is metal-free, the coppering step of Example 1 or 3 is deleted.

In the last column of the Table the shade of the dyeing on cotton obtained with the dyestuffs of Examples 4 to 59 is given. The resulted dyeings have good light-fastness- and good wet-fastness properties.

The 1:1 copper complex of Example 33 is prepared employing the conventional oxidative coppering method.

TABLE

| Ex. No. | A | B | metal complex | shade on cotton |
|---|---|---|---|---|
| 4 | *—C₆H₃(OCH₃)— (2-OCH₃) | —C₆H₃(N(C₂H₅)₂)(NHCOCH₃) | — | blue |
| 5 | " | 2-OH-naphthyl-6-SO₃H | 1:1-Cu | grey |
| 6 | " | 2-OH-naphthyl | " | " |
| 7 | " | 2-OH-3-COOH-naphthyl | " | " |
| 8 | " | 2-OH-naphthyl-6-SO₃H | " | " |
| 9 | " | 2-OH-3-SO₃H-naphthyl-6-SO₃H | " | " |

TABLE-continued

| Ex. No. | A | B | metal complex | shade on cotton |
|---|---|---|---|---|
| 10 | " | [naphthalene with OH, CH3, SO3H] | " | " |
| 11 | [phenyl with OCH3, CH3, *] | [naphthalene with OH, NHCOPh, SO3H, SO3H] | 1:1-Cu | grey |
| 12 | " | [OH-C=C(CH3)-C(CH3)=N-NHPh structure] | " | brown |
| 13 | " | [OH-C=C(COOH)-C(CH3)=N-NHPh structure] | " | " |
| 14 | " | [OH-C=C(CH3)-C(CH3)=N-NH-C6H4-SO3H] | — | red |
| 15 | " | " | 1:1-Cu | brown |
| 16 | " | [OH-C=C(CH3)-C(CH3)=N-NH-C6H4-Cl] | " | red-brown |
| 17 | [phenyl with OCH3, CH3, OCH3, *] | [phenyl with OH, CH3, SO3H] | " | olive |

TABLE-continued

| Ex. No. | A | B | metal complex | shade on cotton |
|---|---|---|---|---|
| 18 | " | 3-hydroxy-methyl-naphthalene-SO₃H structure | " | grey |
| 19 | " | same as in Ex. 5 | " | " |
| 20 | 2,5-dimethoxyphenyl (OCH₃, OCH₃) | same as in Ex. 4 | — | grey |
| 21 | " | same as in Ex. 6 | 1:1-Cu | " |
| 22 | " | same as in Ex. 7 | " | " |
| 23 | " | same as in Ex. 8 | " | " |
| 24 | " | same as in Ex. 9 | " | " |
| 25 | " | same as in Ex. 10 | " | " |
| 26 | " | same as in Ex. 11 | " | " |
| 27 | " | same as in Ex. 12 | " | " |
| 28 | " | same as in Ex. 13 | " | " |
| 29 | " | same as in Ex. 14 | " | " |
| 30 | " | same as in Ex. 16 | " | " |
| 31 | 3,4-dimethylphenyl (CH₃) | pyrazolone-phenyl-SO₃H structure (meta) | — | orange |
| 32 | " | pyrazolone-phenyl-SO₃H structure (para) | — | " |
| 33 | " | " | 1:1-Cu | brown |
| 34 | " | same as in Ex. 13 | — | orange |
| 35 | " | same as in Ex. 18 | — | blue |
| 36 | " | same as in Ex. 10 | — | " |
| 37 | " | same as in Ex. 5 | — | " |
| 38 | " | same as in Ex. 8 | — | " |
| 39 | 3,4-dimethylphenyl (CH₃) | O=C—NH—naphthyl-SO₃H with —CH(C(=O)CH₃) | — | orange |

TABLE-continued
| Ex. No. | A | B | metal complex | shade on cotton |
|---|---|---|---|---|
| 40 | 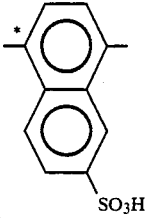 | 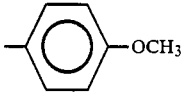 | — | violet |
| 41 | " | 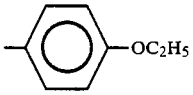 | — | " |
| 42 | " | same as in Ex. 14 | — | bordeaux |
| 43 | " | same as in Ex. 13 | — | " |
| 44 | " | same as in Ex. 18 | — | grey |
| 45 | " | same as in Ex. 5 | — | " |
| 46 | 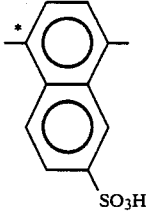 | same as in Ex. 8 | — | grey |
| 47 | " | 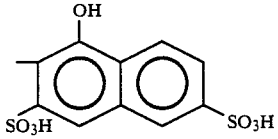 | — | " |
| 48 | " | 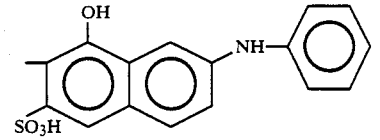 | — | " |
| 49 | 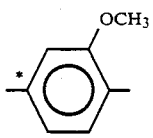 | " | 1:1-Cu | " |
| 50 | 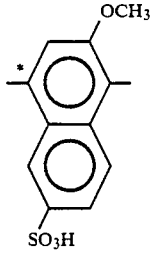 | same as in Ex. 40 | — | violet |
| 51 | " | same as in Ex. 41 | — | " |
| 52 | " | same as in Ex. 14 | — | brown |
| 53 | " | same as in Ex. 14 | 1:1-Cu | grey |
| 54 | " | same as in Ex. 18 | " | olive |
| 55 | " | same as in Ex. 5 | " | " |
| 56 | " | same as in Ex. 9 | " | " |
| 57 | " | same as in Ex. 7 | " | " |
| 58 | " | same as in Ex. 11 | — | black |

TABLE-continued

| Ex. No. | A | B | metal complex | shade on cotton |
|---|---|---|---|---|
| 59 | " | 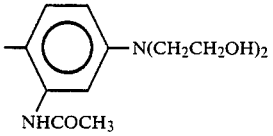 | — | blue |

In analogy with the method described in Example 2 corresponding mixtures with the dyestuffs of Examples 4–10, 17–25, 35–38, 40, 41, 44–46, 50, 51, 54–57 and 59 may be prepared.

The dyestuffs or dyestuff mixtures according to the Examples are obtained in the sodium salt form. They may, depending on the reaction- and isolation-conditions or by reacting the sodium salts in accordance with known methods, also be obtained in free acid form or in other salt forms or in mixed salt forms, for example those salt forms indicated in the description hereinbefore.

In the following examples the application of the dyestuffs or mixtures of this invention is illustrated.

APPLICATION EXAMPLE A 0.5 Parts of the dyestuff mixture according to Example 2 are dissolved in 200 parts water at 60°. 10 Parts cotton fabric, 16 parts Glauber's salt and 4 parts sodium carbonate are subsequently added to the dyebath. The bath is raised to 98° over 45 minutes.

Dyeing is continued for 1 hour at 98°. During dyeing, the water that evaporates is continuously replaced. The dyed fabric is then removed from the liquor, rinsed with cold and hot water, soaped at the boil during 20 minutes in 500 parts water and 0.5 parts sodium alkysulphonate, rinsed again and dried. A dark-brown dyeing is obtained having good light- and wet-fastness-properties and good fastness to chlorinated water.

APPLICATION EXAMPLE B 0.5 Parts of the dye of Example 1 or 3 or of the dye mixture according to Example 2 are dissolved in 200 parts demineralized water. 10 Parts cotton cretonne (bleached) are added to the dye-bath of 50°–60° and the bath is raised to 98° within 30 minutes. Then 1 part and after 10 minutes further 2 parts calcinated Glauber's salt are added maintaining the temperature at 98° for further 35 minutes. Subsequently, it is cooled to 80° within 15 minutes. During the dyeing procedure, the water that evaporates is replaced with demineralized water of 98°. The dyed fabric is rinsed with running cold water, centrifuged and dried at 80°. A cotton dyeing with good light- and wet-fastness properties is obtained which, for the dyestuff of Example 1 and for the dye mixture of Example 2, is of dark-brown shade and which, for the dyestuff of Example 3, is of grey shade.

In analogous manner as described in Application Example A or B, dyeing may be effected employing a dyestuff of Examples 4 to 59 or a dye mixture according to Example 2 using an appropriate dyestuff as defined hereinbefore.

APPLICATION EXAMPLE C (after-treatment)

A cotton fabric dyed according to Application Example B with 1/1 standard depth dyeing of the dyestuff of Example 1 or 3 or of a dye mixture according to Example 2 is padded with an aqueous solution containing 100 g/l of a fixing agent which is a mixture given below, and squeezed out to give a pick-up of about 80%. The fabric is then shock-dried on a tension frame at 175°–180° in such a way that the cross-linking time of the dry fabric is 30–45 seconds at this temperature.

The fixing agent is a reaction product (at 70° during 3 hours) of (A) 68.5 parts of a spray-dried solution at pH 7.5 which has been obtained by condensation of 103 parts diethylene triamine with 84 parts dicyandiamide at 110° (→160°) and subsequent stepwise neutralisation with 44.6% sulphuric acid with the addition of ice, and (C) 457 parts of a 50% solution of dimethyloldihydroxyethylene urea heated 70°, to which 23 parts dicyandiamide as stabilizing agent are added. This product may be used as such or together with a catalyst for the crosslinking e.g. magnesium chloride.

The obtained ark-brown (grey) cotton dyeing fixed in such a way exhibits excellent wash-fastness, and withstands repeated 60° washes and even a wash at the boil. At the same time a clear improvement of crease resistance is obtained, and the swelling value of the cellulose fibres is reduced.

APPLICATION EXAMPLE D (after-treatment)

Instead of the fixing agent used in Application Example C it is also possible to employ the water-soluble precondensate which is obtained by reacting (B) 100 parts of a 50% aqueous solution of the reaction product of epichlorohydrin and dimethylamine with (C) 150 parts of a 50% aqueous solution of dimethyloldihydroxyethylene urea in the presence of (D) 20 parts magnesium chloride.hexahydrate at 70° during 30 minutes.

The resulted dark-brown (grey) cotton dyeing after-treated in such a way shows excellent wash-fastness. At the same time a clear improvement of crease resistance is obtained, and the swelling value of the cellulose fibres is reduced.

In analogy with the method described in Application Example C or d the cotton dyeings obtained with each of the dyestuffs of Examples 4 to 59 with a dye mixture according to Example 2 employing the appropriate dyestuffs may be aftertreated to obtain cotton dyeings which show remarkably improved wash-fastness properties.

What we claim is:

1. a mixture consisting essentially of (a) a 1:1 copper complex of a compound of the formula

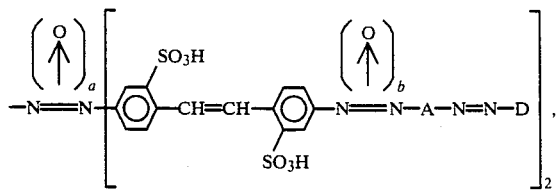

or a salt thereof each cation of which is independently a non-chromophoric cation, and (b) a 1:1 copper complex of a compound of the formula

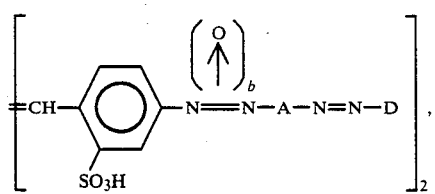

or a salt thereof each cation of which is independently a non-chromophoric cation, wherein
  each A is independently

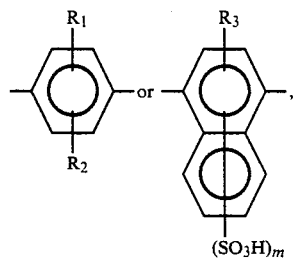

wherein
  $R_1$ is hydrogen, halo, $C_{1-4}$alkyl or $C_{1-4}$alkoxy,
  $R_2$ is hydrogen, halo, $C_{1-4}$alkyl, $C_{1-4}$alkoxy, ureido or ($C_{1-4}$alkyl)carbonylamino,
  $R_3$ is hydrogen or methoxy, and m is 0, 1 or 2,
  each D is independently

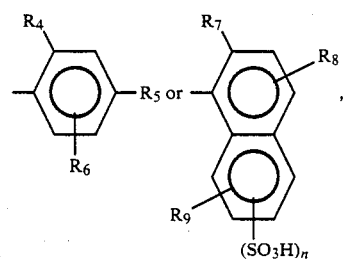

wherein
  $R_4$ is hydrogen, hydroxy or methoxy,
  $R_5$ is hydrogen, hydroxy, $C_{1-4}$alkyl, $C_{2-4}$hydroxyalkyl, $C_{1-4}$alkoxy, $C_{2-4}$hydroxyalkoxy or —N($R_{14}$)$_2$, wherein each $R_{14}$ is independently hydrogen, $C_{1-4}$alkyl or $C_{2-4}$alkyl substituted by 1 or 2 substituents each of which is independently hydroxy, cyano, halo or $C_{1-4}$alkoxy,
  $R_6$ is hydrogen, $C_{1-4}$alkyl, $C_{2-4}$hydroxyalkyl, $C_{1-4}$alkoxy, ($C_{1-4}$alkyl)carbonylamino, carboxy or sulfo,
  $R_7$ is hydrogen, hydroxy or methoxy, $R_8$ is hydrogen, carboxy or sulfo,
  $R_9$ is hydrogen or hydroxy, and
  n is 0, 1 or 2, and
  a and each b is independently 0 or 1,
wherein the ratio of component (a) to component (b) is 2⅓:1 to 1:1.5 by weight.

2. A mixture according to claim 1 wherein the ratio of component (a) to component (b) is 1.5:1 to 1:1.5 by weight.

3. A mixture according to claim 1 wherein the ratio of component (a) to component (b) is 2⅓:1 to 1:1 by weight.

4. A mixture according to claim 3 wherein the ratio of component (a) to component (b) is about 1:1 by weight.

5. A mixture according to claim 4 consisting essentially of (a) a sodium salt of the 1:1 copper complex of the formula

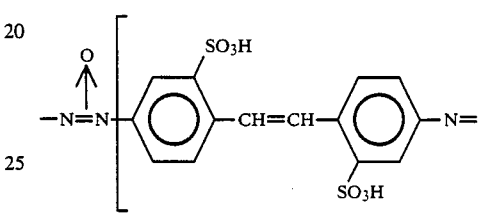

and (b) a sodium salt of the 1:1 copper complex of the formula

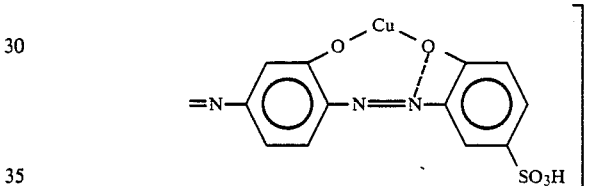

wherein the ratio of component (a) to component (b) is about 1:1 by weight.

6. A mixture according to claim 1 wherein each cation is independently lithium, sodium, potassium, ammonium, methylammonium, dimethylammonium, trimethylammonium, tetramethylammonium, triethylammonium, ethanolammonium, diethanolammonium or triethanolammonium.

7. A mixture according to claim 6 wherein the cations are the same.

8. A mixture according to claim 7 wherein the ration of component (a) to component (b) is 1.5:1 to 1:1.5 by weight.

9. A mixture according to claim 7 wherein the ratio of component (a) to component (b) is 2⅓:1 to 1:1 by weight.

10. A mixture according to claim 9 wherein the ratio of component (a) to component (b) is about 1:1 by weight.

* * * * *